United States Patent
Nagatsuka

(10) Patent No.: US 10,065,217 B2
(45) Date of Patent: Sep. 4, 2018

(54) SCRAPING DEVICE AND SCRAPING METHOD USING ROBOT

(71) Applicant: FANUC CORPORATION, Minamitsuru-gun, Yamanashi (JP)

(72) Inventor: Yoshiharu Nagatsuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/007,738

(22) Filed: Jan. 27, 2016

(65) Prior Publication Data

US 2016/0214143 A1 Jul. 28, 2016

(30) Foreign Application Priority Data

Jan. 28, 2015 (JP) ................. 2015-014510

(51) Int. Cl.
| | |
|---|---|
| *G06F 19/00* | (2018.01) |
| *B08B 1/00* | (2006.01) |
| *B25J 9/16* | (2006.01) |
| *B25J 11/00* | (2006.01) |
| *B25J 13/08* | (2006.01) |

(52) U.S. Cl.
CPC ............ *B08B 1/005* (2013.01); *B08B 1/00* (2013.01); *B25J 9/1612* (2013.01); *B25J 9/1671* (2013.01); *B25J 9/1694* (2013.01); *B25J 9/1697* (2013.01); *B25J 11/005* (2013.01); *B25J 13/085* (2013.01); *Y10S 901/09* (2013.01); *Y10S 901/41* (2013.01)

(58) Field of Classification Search
CPC .......... B08B 1/005; B08B 1/00; B25J 9/1612; B25J 9/1671; B25J 9/1694; B25J 9/1697; B25J 11/005; B25J 13/085
See application file for complete search history.

(56) References Cited

U.S. PATENT DOCUMENTS

| | | | | |
|---|---|---|---|---|
| 9,517,563 | B2* | 12/2016 | Watanabe | B25J 9/1607 |
| 9,519,736 | B2* | 12/2016 | Atohira | G06F 17/5009 |
| 9,561,571 | B2* | 2/2017 | Wielens | B23Q 17/22 |
| 2009/0187276 | A1* | 7/2009 | Nagatsuka | B25J 9/1697 |
| | | | | 700/245 |

FOREIGN PATENT DOCUMENTS

| | | |
|---|---|---|
| JP | 57107733 A | 7/1982 |
| JP | 58106172 U1 | 7/1983 |
| JP | 5-123921 | 5/1993 |
| JP | 07108417 A | 4/1995 |
| JP | 09070716 A | 3/1997 |
| JP | 2009175954 A | 8/2009 |
| JP | 2010-240809 | 10/2010 |

OTHER PUBLICATIONS

JP9070716 in veiw of English Translation; Mar. 1997.*

* cited by examiner

*Primary Examiner* — Mingjen Jen
(74) *Attorney, Agent, or Firm* — RatnerPrestia

(57) ABSTRACT

A scraping device and a scraping method, by which a scraping process using a robot can be automated, and workload of an operator can be significantly reduced. The scraping device includes a robot which grips or holds a scraping tool, and a robot controller which controls the robot. The robot is a multi-joint robot having six axes, and has a robot arm and a robot hand attached to a front end of the robot arm. The scraping tool is gripped or held by the robot hand. The scraping tool has a cutting edge and a vibrator which vibrates the cutting edge at high velocity, and the robot hand grips the scraping tool while the cutting edge is vibrated at high velocity.

3 Claims, 5 Drawing Sheets

SCRAPING DEVICE AND SCRAPING METHOD USING ROBOT

BACKGROUND OF THE INVENTION

1. Field of the Invention

The present invention relates to a device and a method for carrying out a scraping process by using a robot.

2. Description of the Related Art

In the prior art, when a scraping process is carried out as a fine finishing process for a sliding surface or a guiding surface of a machine device, a medium (red lead) or a pigment is applied to a surface to be processed, and an operator manually carries out the scraping process by using a scraping tool, while visually checking for color difference on the surface.

Since such a process is tedious and labor-intensive, it has been proposed to use a robot so as to automatically carry out the scraping process. For example, JP H05-123921 A describes that concavity and convexity of a processing surface of an object to be processed are displayed by color; the position and inclination of the processing surface of the object are measured by using a processing robot; the processing surface displayed by color is captured by the robot; the convexity to be scraped is identified and stored by a control system; and the processing robot is operated by the control system based on the identification so as to carry out the scraping process.

As another relevant prior art document regarding the scraping process using a robot, JP 2010-240809 A discloses an automatic scraping device having a robot and a scraping tool detachably attached to a hand of the robot, in which the scraping tool is operated so as to carry out a scraping process of a processing surface of an object to be processed.

In the technique of JP H05-123921 A, the scraping process may be automated by attaching the scraping tool to the robot. However, it is difficult to carry out the scraping process when a conventional scraping tool is attached to the robot. Concretely, due to a reactive force, etc., applied to the scraping tool during the scraping, the robot cannot stiffly grip the scraping tool and the tool may slip on the surface, whereby the scraping process cannot be appropriately carried out.

On the other hand, JP 2010-240809 A describes that a cutting angle of the scraping tool may be changed based on the shape of a marking part so as to prevent an amount of cutting from being decreased. However, the control of the robot may be complicated due to such a configuration, and the tool may also slip in such a case.

SUMMARY OF THE INVENTION

An object of the present invention is to provide a scraping device and a scraping method, by which a scraping process using a robot can be automated, and workload of an operator can be significantly reduced.

According to one aspect of the present invention, there is provided a scraping device for carrying out a scraping process of a metallic surface, the scraping device comprising: a scraping tool having a cutting edge vibrated by a vibrator; and a robot configured to grip the scraping tool.

In a preferred embodiment, a camera for capturing the metallic surface is attached to the robot, an image obtained by the camera is processed so as to detect a position and orientation of the metallic surface and a position of a concavo-convex portion on the metallic surface, and the scraping process is carried out based on a result of the detection. In this case, the camera may be exchangeable with the scraping tool by using an automatic attaching/detaching unit attached to a front end of an arm of the robot.

In a preferred embodiment, the robot has a force sensor which detects a reactive force applied to the scraping tool during the scraping process.

In a preferred embodiment, the scraping device further comprises: a screen which displays a virtual model of an object to be processed having the metallic surface; and a virtual unit which generates a measuring motion program for measuring a processing portion of the object by using a camera attached to the robot, based on information of the processing portion of the object.

According to another aspect of the present invention, there is provided a scraping method for carrying out a scraping process on a metallic surface, the scraping method comprising the steps of: operating a robot so as to grip a scraping tool having a cutting edge vibrated by a vibrator; and operating the robot so as to carry out the scraping process of the metallic surface.

The above scraping method may further comprise the steps of: processing an image obtained by capturing the metallic surface by using a camera attached to the robot; detecting a position and orientation of the metallic surface and a position of a concavo-convex portion on the metallic surface; and carrying out the scraping process based on a result of the detecting.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
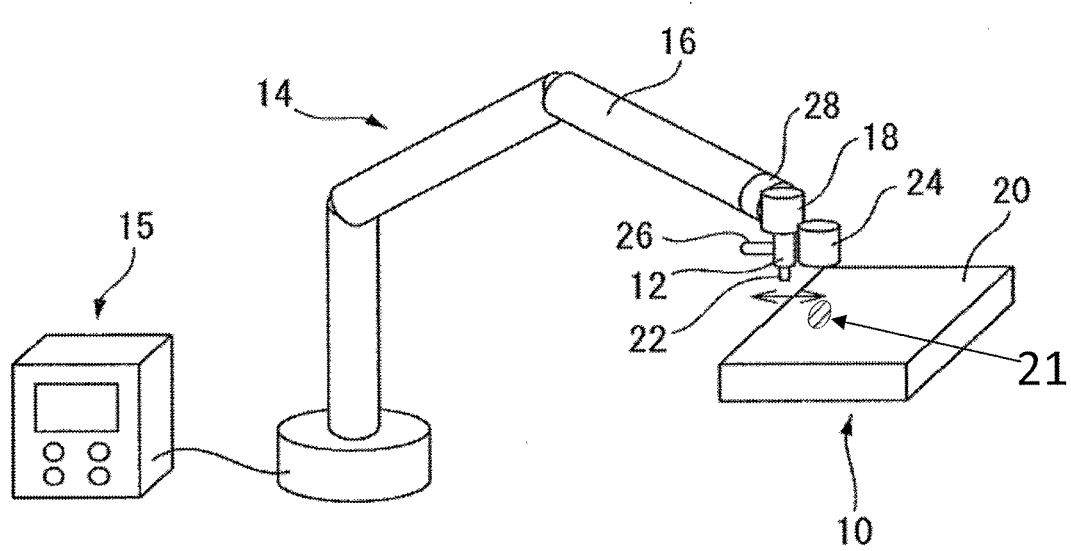
FIG. 1 is a schematic view showing a scraping device according to a first embodiment of the present invention.

FIG. 1 is a view schematically showing a scraping device according to a first embodiment of the present invention, along with a workpiece 10 to be processed by the scraping device. The scraping device includes a robot 14 which grips or holds a scraping tool 12, and a robot controller 15 which controls robot 14. In the illustrated embodiment, robot 14 is a multi-joint robot (having six axes), and has a robot arm 16 and a robot hand 18 attached to a front end of robot arm 16. Scraping tool 12 is gripped or held by robot hand 18. For example, workpiece 10 is a bed or a grinding surface plate of a machine tool, and has a (metallic) processing surface 20 which is an object to be processed by scraping. In other words, the scraping device is configured to carry out a scraping process by using scraping tool 12 gripped by robot 14, with respect to processing surface 20 having a microasperity 21 (small concavity and convexity, such as a burr).

Optionally, robot 14 may have a measurement unit (in the drawing, a camera) 24 for measuring the position and/or orientation of workpiece 10, and the position and the shape of a concavo-convex portion on the processing surface. In the embodiment of FIG. 1, camera 24 is attached to a front end (or robot hand 18) of robot arm 16. On the other hand, robot controller 15 has: a function (processing/detecting part) for processing an image captured by camera 24 and detecting the position of workpiece 10 and/or a concavo-convex portion on processing surface 20; a function (storing part) for storing a result of the detection; and a function (controlling part) for controlling a servomotor (not shown) for driving each axis of robot 14. Therefore, by capturing workpiece 10 by camera 24, the position and orientation of workpiece 10, the position and the shape of the concave-convex portion of processing surface 20 can be detected. As a result, the position and the shape of an object (or a protruding portion) to be processed or scraped by the scraping can also be detected.

Scraping tool 12 has a cutting edge 22 and a vibrator 26 which vibrates cutting edge 22 at high velocity, and robot hand 18 grips scraping tool 12 while cutting edge is vibrated at high velocity. Vibrator 26 is separately arranged from robot hand 18 and robot arm 16, and is used to vibrate cutting edge 22 of scraping tool 12 at high velocity. For example, an ultrasonic transducer, a vibration motor or a piezoelectric element, attached to scraping tool 12, may be used as vibrator 26. In this regard, the "high velocity" may vary depending on the physical property of processing surface 20 and/or the shape of scraping tool 12. For example, the "high velocity" may include a frequency of 100 Hz or more, 300 Hz or more, 500 Hz or more, 1 kHz or more, or 10 kHz or more.

Since robot 14 grips scraping tool 12 having cutting edge 22 vibrated at high velocity by vibrator 26, it is sufficient that robot 14 has a function for pressing cutting edge 22 of scraping tool 12 against processing surface 20 of workpiece 10 with a predetermined force. In other words, it is not necessary for robot 14 to slide scraping tool 12 along processing surface 20. Therefore, since a relatively large reactive force is not applied to robot hand 18, positional misalignment between robot hand 18 and scraping tool 12 gripped by the hand does not occur even when the stiffness of the robot is relatively low, whereby the scraping process can be precisely carried out.

Next, a flow of the scraping process using the scraping device of the first embodiment will be explained, with reference to a flowchart of FIG. 2. First, in step S11, an image obtained by capturing workpiece 10 (processing surface 20) by using camera 24 attached to robot 14 is processed so as to detect the position and orientation of workpiece 10 (processing surface 20). Then, the position of the concavo-convex portion on processing surface 20 is detected (step S12). When the position and/or the shape of the concave-convex portion of processing surface 20 is detected by camera 24, it is not necessary to apply a red lead, etc., to the protruding portion on the processing surface, unlike the prior art. However, the red lead, etc., may be applied to the protruding portion so as to facilitate or assist the image processing.

Next, based on the detection result of camera 24, a processing program for carrying out the scraping process by robot 14 is generated (step S13). By executing the processing program, the scraping process is carried out (step S14). In this regard, the processing program may be generated by robot controller 15. Alternatively, the processing program may be generated by another program generating means.

By detecting the concavity and convexity of the processing surface by using the measurement unit such as camera 24, teaching of the robot for the scraping process can be facilitated, and thus the scraping process can be easily automated. In step S12 as explained above, the shape of the concavo-convex portion of processing surface 20 may also be detected by camera 24, as well as the position of the concavo-convex portion, whereby the scraping process can be precisely carried out. Further, a force sensor 28 for detecting a reactive force applied to scraping tool 12 during the scraping process may be arranged on robot 14. In this case, in step S14, the protruding portion of processing surface 20 can be processed until the reactive force is not detected, whereby the scraping process can be effectively carried out.

Figure 3:
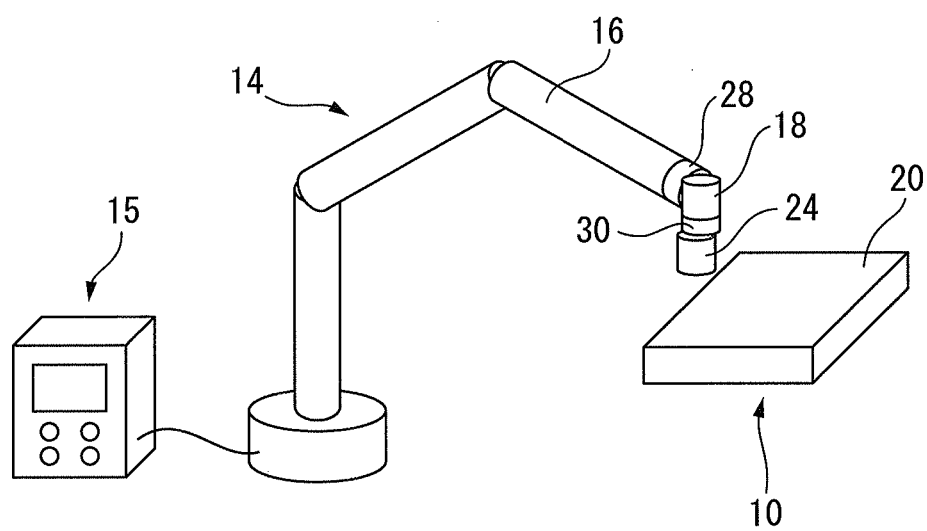
FIG. 3 is a schematic view showing a scraping device according to a second embodiment of the present invention, in which a camera is attached to an automatic attaching/detaching unit.
Figure 4:
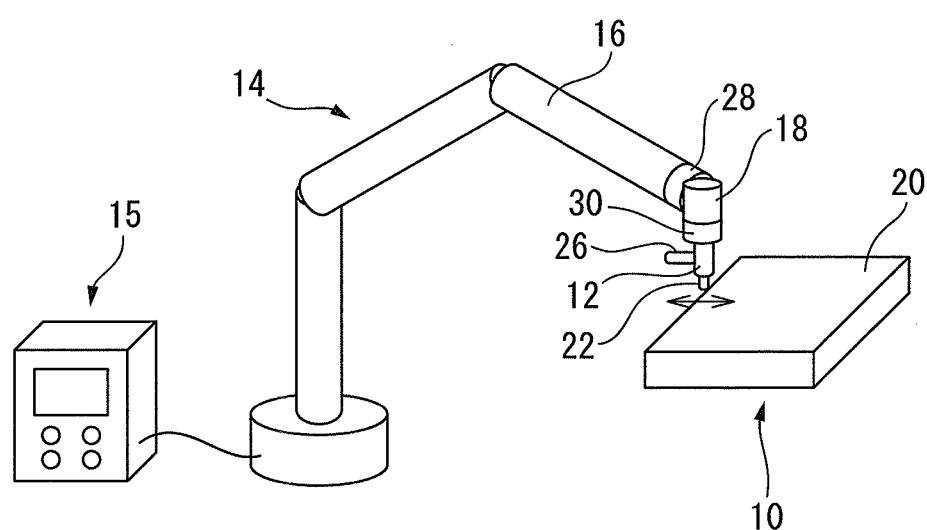
FIG. 4 is a schematic view showing the scraping device according to the second embodiment of the present invention, in which a scraping tool is attached to the automatic attaching/detaching unit.

FIGS. 3 and 4 schematically show a scraping device according to a second embodiment of the present invention. The second embodiment is different from the first embodiment in that robot 14 has an automatic attaching/detaching unit 30 configured to automatically attach/detach one of camera 24 and scraping tool 12 (or exchange one of them with another), and the other components of the second embodiment may be the same as the first embodiment. Therefore, in FIG. 3, to the components of the second embodiment corresponding to the components of the first embodiment, the same reference numerals are added, and detailed explanations thereof will be omitted.

For example, a conventional tool changer, etc., may be used as automatic attaching/detaching unit 30. Automatic attaching/detaching unit 30 is attached to robot hand 18, and is configured to automatically exchange camera 24 with scraping tool 12 or vice versa. FIG. 3 shows a state in which camera 24 is attached to automatic attaching/detaching unit 30, and FIG. 4 shows a state in which scraping tool 12 is attached to automatic attaching/detaching unit 30. On the other hand, robot controller 15 has a function (attachment command generating pat) for generating an attachment command so that one of camera 24 and scraping tool 12 is selected and attached to automatic attaching/detaching unit 30.

Next, a flow of the scraping process using the scraping device of the second embodiment will be explained, with reference to a flowchart of FIG. 5. First, as shown in FIG. 3, camera 24 is attached to the front end (automatic attaching/detaching unit 30) of robot arm 16 (step S21). Next, similarly to steps S11 and S12 of FIG. 2, an image obtained by capturing workpiece 10 (processing surface 20) by using camera 24 is processed so as to detect the position and orientation of workpiece 10 (step S22), and then, the position of the concavo-convex portion on processing surface 20 is detected (step S23).

Figure 2:
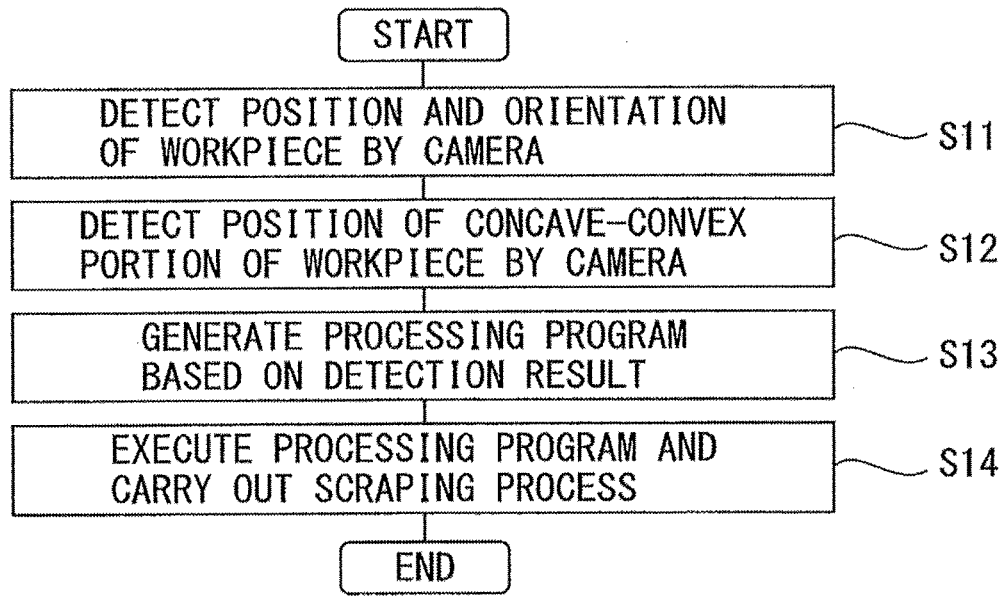
FIG. 2 is a flowchart indicating a flow of a scraping process using the scraping device of the first embodiment.

In the next step S24, similarly to step S13 of FIG. 2, based on the detection result of camera 24, a processing program for carrying out the scraping process by robot 14 is generated. Then, camera 24 is detached from the front end (automatic attaching/detaching unit 30) of robot arm 16, and scraping tool 12 is attached thereto, instead of the camera (step S25). Finally, by executing the generated processing program, the scraping process is carried out (step S26). In this regard, the processing program may be generated by robot controller 15. Alternatively, the processing program may be generated by another program generating means.

In step S23 as explained above, the shape of the concavo-convex portion of processing surface 20 may also be detected by camera 24, as well as the position of the concavo-convex portion, whereby the scraping process can be precisely carried out. Further, force sensor 28 for detecting a reactive force applied to scraping tool 12 during the scraping process may be arranged on robot 14. In this case, in step S26, the protruding portion of processing surface 20 can be processed until the reactive force is not detected, whereby the scraping process can be effectively carried out.

Figure 6:
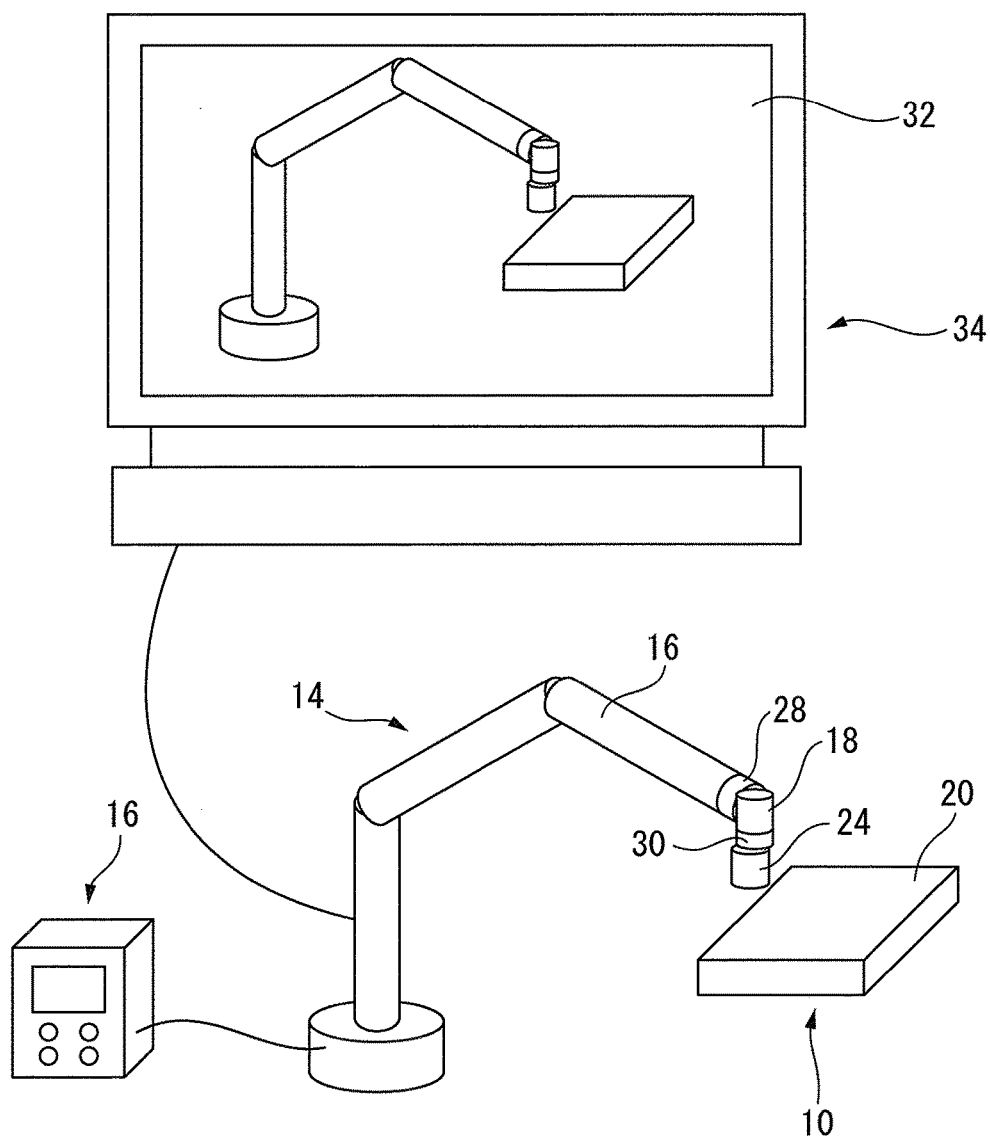
FIG. 6 is a schematic view showing a scraping device according to a third embodiment of the present invention.

FIG. 6 schematically shows a scraping device according to a third embodiment of the present invention. The third embodiment is different from the second embodiment in that a processing program can be generated offline by using a virtual unit, and the other components of the third embodiment may be the same as the second embodiment. Therefore, in FIG. 6, to the components of the third embodiment corresponding to the components of the second embodiment, the same reference numerals are added, and detailed explanations thereof will be omitted.

As shown in FIG. 6, robot 14 is connected to a virtual unit (for example, a personal computer) having a display or screen 32 by a wire or by radio. Virtual unit 34 is configured to: display virtual models of robot 14 and workpiece 10; designate a processing portion to be processed; generate a measurement motion program; and generate the processing program, etc., as explained below.

Figure 7:
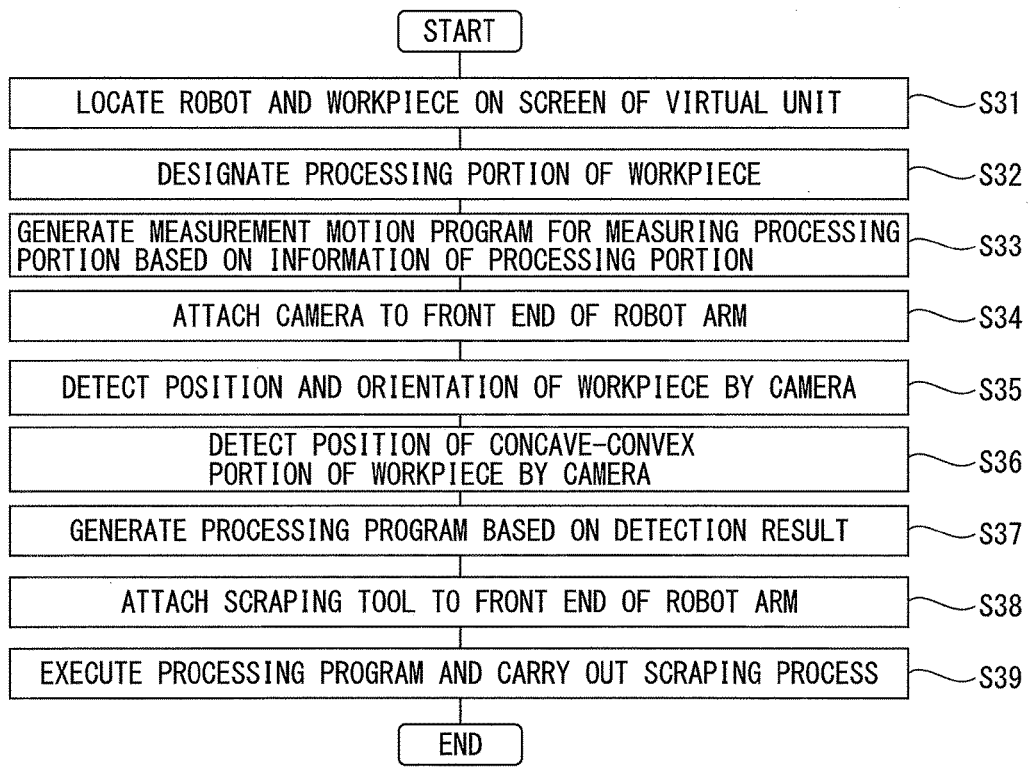
FIG. 7 is a flowchart indicating a flow of a scraping process using the scraping device of the third embodiment.

Next, a flow of the scraping process using the scraping device of the third embodiment will be explained, with reference to a flowchart of FIG. 7. First, as shown in FIG. 6, virtual models (for example, three-dimensional models) of robot 14 and workpiece 10 are displayed on screen 32 (or located in a virtual space) of virtual unit 34 (step S31). Next, a processing portion (in this example, processing surface 20 of workpiece 10), where the scraping process by robot 14 is to be carried out, is designated (step S32). The procedure in steps S31 and S32 may be carried out based on an input from an interface, etc., of virtual unit 34 operated by the operator, otherwise, it may be automatically carried out by virtual unit 34 based on a predetermined algorithm.

In the next step S33, based on the information, etc., of the processing portion designated in step S32, a measurement motion program for measuring the processing portion by camera 24 attached to (automatic attaching/detaching unit 30 of) robot 14 is generated. This procedure may be automatically carried out by virtual unit 34.

Figure 5:
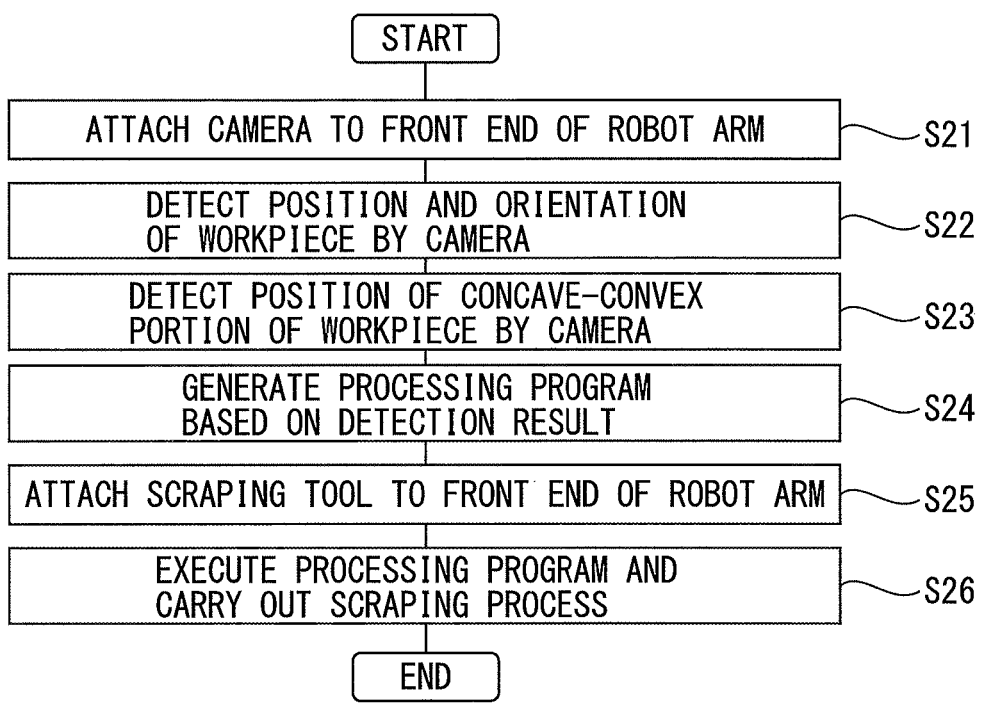
FIG. 5 is a flowchart indicating a flow of a scraping process using the scraping device of the second embodiment.

Next, similarly to steps S21 to S23 of FIG. 5, camera 24 is attached to the front end (automatic attaching/detaching unit 30) of robot arm 16 (step S34), an image obtained by capturing workpiece 10 (processing surface 20) by using camera 24 is processed so as to detect the position and orientation of workpiece 10 (step S35), and then, the position of the concavo-convex portion on processing surface 20 is detected (step S36).

In the next step S37, similarly to step S24 of FIG. 5, based on the detection result of camera 24, a processing program for carrying out the scraping process by robot 14 is generated. Then, similarly to step S25 of FIG. 5, camera 24 is detached from the front end (automatic attaching/detaching unit 30) of robot arm 16, and scraping tool 12 is attached thereto, instead of the camera (step S38). Finally, similarly to step S26 of FIG. 5, by executing the generated processing program, the scraping process is carried out (step S39). In this regard, the procedure from steps S31 to S37 may be carried out offline by virtual unit 34, and the procedure of steps S38 and S39 may be carried out by the actual robot.

In step S36 as explained above, the shape of the concavo-convex portion of processing surface 20 may also be detected by camera 24, as well as the position of the concavo-convex portion, whereby the scraping process can be precisely carried out. Further, force sensor 28 for detecting a reactive force applied to scraping tool 12 during the scraping process may be arranged on robot 14. In this case, in step S39, the protruding portion of processing surface 20 can be processed until the reactive force is not detected, whereby the scraping process can be effectively carried out.

The above embodiments as explained above may be changed or modified. For example, although the third embodiment corresponds to a configuration in which the virtual unit is added to the second embodiment, a configuration in which the virtual unit is added to the first embodiment may be used as the scraping device of the present invention.

According to the present invention, it is sufficient that the robot grips the scraping tool vibrated by the vibrator and presses the tool against the metallic surface, during the scraping process. Therefore, the scraping process can be stably and automatically carried out by the robot, whereby workload of the operator can be significantly reduced.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. A scraping device for carrying out a scraping process of a metallic surface, the scraping device comprising:
   a scraping tool having a cutting edge vibrated by a vibrator;
   a robot configured to grip the scraping tool;
   a camera attached to the robot, configured to capture an image of the metallic surface;
   a force sensor, provided to the robot, configured to detect a reactive force applied to the scraping tool during the scraping process;
   a screen configured to display a virtual model of an object to be processed having the metallic surface; and
   a processor configured to:
     generate a measuring motion program for measuring the metallic surface of the object;
     process the image of the metallic surface obtained by the camera to detect a position and orientation of the metallic surface and a position of a concavo-convex portion on the metallic surface; and
     execute the scraping process by controlling the robot to position the scraping tool to come into contact with the detected concavo-convex portion on the metallic surface, and controlling the robot to vibrate the scraping tool until the reactive force detected by the force sensor is below a threshold.

2. The scraping device as set forth in claim 1, wherein the camera is exchangeable with the scraping tool by using an automatic attaching/detaching unit attached to a front end of an arm of the robot.

3. A scraping method for carrying out a scraping process on a metallic surface, the scraping method comprising the steps of:
   operating a robot so as to grip a scraping tool having a cutting edge vibrated by a vibrator;
   operating the robot so as to carry out the scraping process of the metallic surface;

capturing, by a camera coupled to the robot, an image of the metallic surface;
detecting, by a force sensor coupled to the robot, a reactive force applied to the scraping tool during the scraping process;
displaying a virtual model of an object to be processed having the metallic surface;
generating, by a processor, a measuring motion program for measuring the metallic surface of the object;
processing, by the processor, the image of the metallic surface;
detecting, by the processor, a position and orientation of the metallic surface and a position of a concavo-convex portion on the metallic surface; and
executing, by the processor, the scraping process by controlling the robot to position the scraping tool to come into contact with the detected concavo-convex portion on the metallic surface, and controlling the robot to vibrate the scraping tool until the reactive force detected by the force sensor is below a threshold.

* * * * *